Dec. 20, 1955   J. W. MOORE   2,728,018
METHOD AND APPARATUS FOR REGULATING
ELECTRIC FURNACE ELECTRODES

Filed March 5, 1953   3 Sheets-Sheet 1

*INVENTOR.*
JAMES WRIGHT MOORE.
BY
Christy, Parmelee, Strickland
*ATTORNEYS.*

INVENTOR.
JAMES WRIGHT MOORE.
BY
Christy, Parmelee & Strickland
ATTORNEYS.

Dec. 20, 1955  J. W. MOORE  2,728,018
METHOD AND APPARATUS FOR REGULATING
ELECTRIC FURNACE ELECTRODES
Filed March 5, 1953  3 Sheets-Sheet 3

INVENTOR.
JAMES WRIGHT MOORE.
BY
Christy, Parmelee, Strickland
ATTORNEYS.

United States Patent Office 2,728,018
Patented Dec. 20, 1955

2,728,018
METHOD AND APPARATUS FOR REGULATING ELECTRIC FURNACE ELECTRODES

James Wright Moore, Pittsburgh, Pa., assignor to Delaware Engineering Corporation, Pittsburgh, Pa., a corporation of Delaware Application March 5, 1953, Serial No. 340,598

11 Claims. (Cl. 314—62)

This invention relates to electric arc furnaces and is for a method and apparatus for regulating the movement of the electrode.

In the conventional electric arc furnace used for metallurgical purposes, the furnace is usually fitted with a roof which can be moved to one side for the purpose of charging the furnace. One or more, usually three, electrodes are supported on the roof of the furnace, and provision is made for adjusting them vertically as required by the operation of the furnace. Normally the electrodes must be lowered to contact the charge in the furnace when the operation is being started. Then they are raised to draw an arc between the electrode and the charge. The electrode burns away as the furnace operates, requiring that it be lowered to keep the proper distance between the end of the electrode and the charge. Also the charge may initially be scrap metal which, as it is heated, melts down, and the electrodes must be lowered to keep the proper distance between the end of the electrode and the charge as it lowers from this cause. For recharging the furnace the electrodes must be raised to a point where they can clear the top edge of the furnace when the roof is swung to one side for charging the furnace.

The movement of the electrodes is effected through an electrical sensing device that responds to the amount of current flowing to each electrode. These sensing devices which are now well known in the art, are so arranged that when the gap between the end of the electrode and the metal increases, making an increased resistance to the flow of current, the mechanism responds to the decreased flow of current and operates the electrode control mechanism to lower the electrode. On the other hand, if there is not sufficient clearance between the end of the electrode and the surface of the metal, resulting in a heavy flow of current, the sensing device responds to the heavier flow of current to cause the electrode control mechanism to raise the electrode.

In some instances the mechanism for raising and lowering the electrode may comprise a fluid pressure ram connected with a reservoir, and a reversible pump driven by an electric motor is employed for pumping the liquid from the reservoir to the ram, or from the ram to the reservoir, depending upon whether the electrode is to be raised or lowered. This motor is controlled by the sensing device above referred to. In many instances, however, fluid pressure systems are not desired, and in most instances a reversible electric motor drives a winch. A cable wound on the winch and passing over sheaves is connected with the electrode. The winch of course unwinds to lower the electrode and winds up the cable to raise the electrode. Here again the motor is responsive to the sensing device above referred to.

In smaller furnaces it has been a common practice to attach a counterweight to the cable, the weight of which is substantially equal to the weight of the electrode assembly, so that the two just about balance each other, and the motor and winch has to exert only enough force in one direction or the other to overcome this condition of balance. If the electrode is to be lowered, the winch is driven in one direction, adding the power of the motor to the weight of the electrode assembly to lower it, and if the electrode is to be raised, the power of the motor is added to the effort of the counterweight to raise the electrode. Very little power is required because the motor has only to overcome substantially the existing condition of balance one way or the other.

More recently, however, furnaces are made of much larger capacity. In some cases the weight of the electrode with the excess mechanism with which it is mounted may be ten tons or more, and the electrode may have a length of from twelve to sixteen feet. This necessitates a counterweight of enormous proportions, and the counterweighting is further complicated by the fact that the top of the furnace has to be raised and moved in a horizontal arc for opening the furnace for charging or for other purposes. This has led to the elimination of a counterweight and to the use of a much more powerful motor and a winch capable of operating the cable directly for raising and lowering the electrode. In such case the motor can be mounted on a lateral extension on the roof of the furnace, and the complication attendant to the use of massive counterweights are avoided, but it has been found that with the massive equipment involved, that the motor does not respond readily to lesser or weaker fluctuations in the sensing mechanism. The sensing mechanism may call for a slight raising or lowering of the electrode, but the motor will remain stalled so that the desired accuracy of regulation is not obtained, and the motor may be overheated.

According to the present invention, the difficulty of such a direct driven winch motor arrangement is overcome by using a biasing electromagnetic means which is constantly exerting a force effective in the same way that a counterweight is effective, so that the weight of the electrode and assembly is at least partially counteracted by said electromagnetic means, whereby the winch operating motor responds more readily to the smaller increments of adjustment demanded by the sensing equipment. While such biasing electromagnetic means might be provided in various ways, as for example by a simple solenoid which is continuously energized in a manner to create a force tending to move the electrode in a direction opposed to gravity, such arrangement would be relatively large and cumbersome, and the same effect can be produced in a much more compact structure by the use of electromagnetic torque means, such for example as a torque or other motor which of itself has insufficient power to effect any movement of the electrode, but which, acting in conjunction with the winch motor, exerts a biasing force tending to oppose the weight of the electrode assembly. It is further contemplated by the present invention that this torque motor may be operated in conjunction with the winch motor to accelerate the lifting speed of the electrode at that time when it is desired to raise the electrode out of operating position to a point where it will clear the top edge of the furnace when the roof is swung to the side.

The principal objects of my invention therefore are to provide in an electrode adjusting mechanism a continuously-operating biasing force which partially offsets the weight of the electrode assembly, and more especially to provide in conjunction with an electrode winch operating motor, an auxiliary torque motor which of itself is incapable of producing sufficient power to move the electrode, but which is continuously exerting an effort to move the electrode.

A further object of my invention is to provide with such a torque motor system, a control circuit whereby the auxiliary torque motor may be used in conjunction with the winch motor to selectively accelerate the movement of the electrode at the times when the electrode is responding to manual rather than automatic operation, for example, when the electrode is being lifted from operating position.

It should be stated that while I shall hereinafter refer to such torque motor as a separate motor for convenience of understanding of my invention and for ease of illustration, and because separate motors having suitable characteristics for the purpose are now available, nevertheless the two motors can be combined in a single frame instead of being physically separated, and such combined arrangement is comprehended by my invention.

Generally, a metallurgical arc furnace of the type here involved has three electrodes passing through the roof, and each is separately adjusted and controlled. The control for each electrode is the same, and therefore in the accompanying drawings I have, for the most part, shown but a single electrode and its control. Also the mechanism generally employs a mast with an arm that supports the electrode, but for purposes of simplification in the diagrammatic views I have schematically indicated the hoisting cable as being directly connected to the electrode.

In the accompanying drawings, from which my invention may be more fully understood:

Fig. 1 is a schematic view of a conventional three-electrode furnace showing schematically the presently used control for one electrode wherein a counterweight is used, this schematic diagram illustrating a present known arrangement, and is shown only for purposes of illustration;

Fig. 2 likewise is a schematic view of a presently used arrangement in which there is no counterbalance, and in which the motor-driven winch is the only means for operating the electrode, this view also being only for general purposes of illustration;

Figure 11:
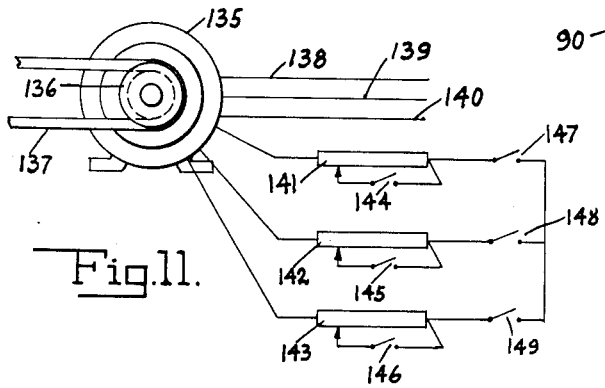
Figure 10:
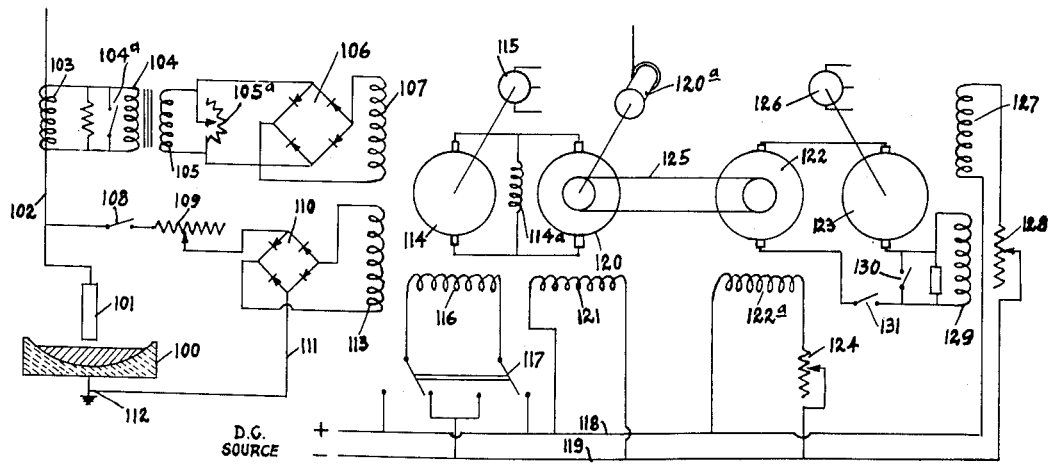

Fig. 10 is a schematic diagram of the complete motor control circuit for a single electrode employing a type of automatic control manufactured by General Electric Company and designated by the trademark "Amplidyne," showing also the independent biasing motor with a circuit whereby the biasing motor may be used to accelerate the speed of lifting or lowering the electrode under manual control; and Fig. 11 is a diagrammatic view showing an alternating current type of torque motor.

Figure 1:
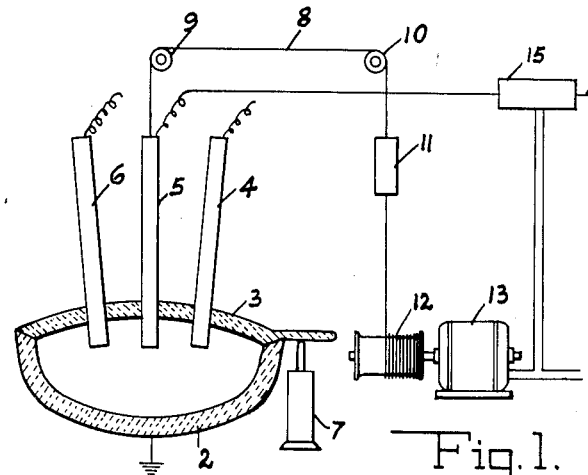

Referring to the drawings, Fig. 1 is a schematic view of the old style of control in which 2 designates the bottom of a tilting electric arc furnace, and 3 is the top having three electrodes 4, 5 and 6 supported therein and passing therethrough. 7 designates a ram by means of which the top may be lifted, and then swung horizontally to clear the top of the furnace body 2, as is well understood in the art.

Each electrode is connected to a source of current, and as above explained, the control for each electrode is the same so that only one control has been illustrated. As diagrammatically shown in Fig. 1, a cable 8 is connected to the electrode for raising and lowering the same, the cable 8 passing over sheaves 9 and 10. At 11 there is a counterweight which substantially balances the weight of the electrode assembly, and 12 designates a winch which is driven by a motor 13. The motor is controlled in response to the current flowing through the line 14 to the electrode 5, the control being schematically indicated at 15. One well known type of control for this purpose is made by General Electric Company and is sold under the trade-mark "Amplidyne," but other similar controls are available and well known in the art.

It will be seen from this simplified diagram that the counterweight 11 substantially balances the weight of the electrode assembly 5, and the motor 13 has only to supply sufficient power in either direction to overcome the balance. This is apparent from the fact that the pulley and sheave arrangement is such that the counterweight goes down when the electrode goes up, and vice versa.

Figure 2:
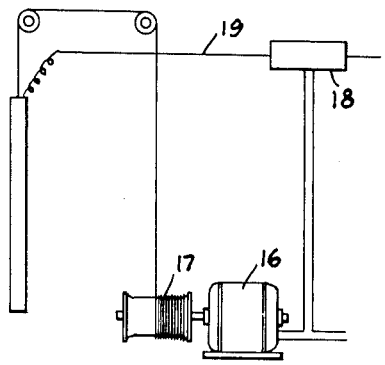

As hereinbefore mentioned, the present weight of electrode assemblies has made the use of counterweights as shown in Fig. 1 quite objectionable due to the great bulk of the necessary counterweight, and further objection arises from the fact that when the furnace is tilted or the position of the roof changed, the suspension system for the counterweight necessarily had to permit of such movement, introducing complications not apparent from the simple diagram shown in Fig. 1. Consequently, as shown in Fig. 2, there has heretofore been used a more powerful motor, such as a motor 16, which drives the winch 17 and there is no counterbalance, the motor having sufficient power to control the movement of the electrode. Here again the motor is controlled through variations of the current flowing to the electrode, the automatic control being schematically illustrated at 18, the current supply line being designated 19. Although not here shown, the motor drives the winch through a worm gear so that when the motor is not operating, the parts are locked against free movement. An objection to the foregoing system as above noted is that the motor is not sufficiently responsive to the smaller variations of current or weaker impulses from the sensing or control device 18.

Figure 3:
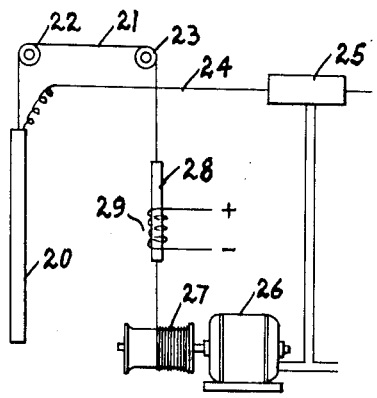
Fig. 3 is a schematic view similar to Fig. 2 illustrating one simple way in which a continuously-effective electromagnetic force could be utilized to counterbalance at least in part the weight of the electrode.

In Fig. 3 there is diagrammed an arrangement similar to Fig. 2, but wherein I have illustrated one means for applying a constant force to the electrode acting in opposition to its weight providing a biasing or counterbalancing action through a continuously energized mechanism to procure an effect somewhat the same as a counterbalance, but wherein energy in place of mass exerts a counteracting force, thus saving space and simplifying the installation.

In this figure the electrode is designated 20, and 21 is the cable by means of which it is operated. The cable 21 passes over sheaves 22 and 23. The current supply wire to the electrode is designated 24, and the sensing or control device is indicated at 25. This device controls the motor 26 which operates a winch 27. I have here shown schematically the cable 21 as being provided with a magnetic core 28 below the sheave 23 and above the winch 27, and surrounding this core is an electromagnet or solenoid 29 which may be continuously energized, creating a downward pull on the core 28 which in effect is similar to the downward pull of the counterweight 11, but which does not involve the massive and cumbersome weights which are required in Fig. 1. Because the solenoid 29 is continuously energized, it always asserts a biasing force in opposition to the action of gravity on the electrode assembly 20. The force exerted by the electromagnet or solenoid, however, is insufficient of itself to raise the electrode 20. However, when the electrode is to be raised, the motor 26, operating the winch 27, is assisted by the magnetic pull of the coil 29, so that the motor 26 will respond more readily to minute fluctuations in the current flow to the electrode. It should be borne in mind in considering the diagram of Fig. 3 that while it appears from the diagram that the motor 26 is directly coupled to the winch 27, there is in fact an intervening worm drive as will hereinafter be more fully shown, so that the weight of the electrode cannot operate to unwind the winch when the motor 26 is de-energized. The important thing in this diagram, however, is that because of the continuous application of power to the coil 29, the action of gravity on the electrode 20 is partly offset, so that when the motor 26 does operate, it needs to exert less power and hence is less likely to stall or remain stationary in response to a feeble variation in the impulses from the sensing device or control unit 25. I use the term "continuously energized" in the sense that the solenoid exerts its force at all times when the furnace is in normal operation, whether the motor 26 is operating or not.

Figure 4:
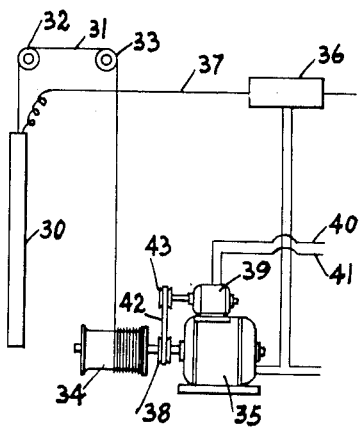
Fig. 4 is a schematic view showing the use of a torque motor operatively connected with the driving motor for the winch for exerting a biasing or counterbalancing force.

Because the solenoid is a continuously acting prime mover, it is far less bulky than a counterweight. At the same time Fig. 3 is largely illustrative and does not represent the most effective or efficient embodiment of my invention, and Fig. 4 diagrammatically indicates a more practical and compact embodiment thereof. In Fig. 4, 30 designates the electrode which is associated with the furnace as in Fig. 1, and it is operated through a cable 31 passing over sheaves 32 and 33, the other end of the cable being wound about a winch 34 that is operated by a motor 35, the organization being similar in this respect to Fig. 2. The motor 35 is controlled by an automatic control unit 36 from the power supplied to the electrode through line 37. In this instance, however, the shaft of the motor 35 is provided with a pulley 38. A separate motor 39, separately energized through wires 40 and 41, set alongside the motor 35, and a belt 42 passing around the pulley 38 and around pulley 43 on the motor shaft 39 operatively connects the motor 39 with the main motor 35 and the electrode operating system.

The motor 39 in this arrangement is a torque motor capable of generating a high torque whether it is stalled or whether it is operating. The motor 39 itself is not sufficiently powerful to effect any movement of the electrode 30. Hence as long as the motor 35 is de-energized, motor 39 is exerting a continuous torque tending to rotate the winch 34 in a direction to lift the electrode, but it is ineffective to move the electrode. However, the continuous torque exerted by the motor 39 is effective to partially offset the weight of the electrode assembly 30, and in a compact arrangement provide a counterbalancing force. When the sensing device 36 requires that the electrode 30 be raised, the motor 35 is operated in the proper direction to wind up on the cable 31, and because the motor 39 is already exerting a torque or force tending to rotate the winch in the same direction, the effort required by the motor 35 is less and the motor 35 will respond instantly to small variations of current through the control 36. If the control 36 requires a lowering of the electrode 30, then the motor 35 must operate in opposition to the motor 39 and actually turn it backwards so that while the winch unwinds to allow the electrode 30 to lower by gravity, the motor 39 does not allow gravity to operate too freely, and exerts a counteracting force. The condition under which the motor 35 operates is thus somewhat comparable to that of the motor 13 in Fig. 1 where the counterweight 11 must be moved upwardly against gravity as the electrode 5 is lowered.

The constantly energized torque motor 39 thus provided in conjunction with the winch motor 35 which is reversibly and intermittently operated, provides a very compact regulating mechanism especially useful for very heavy electrodes, and avoids the use of massive counterweights and the attendant complicated compensating arrangements. A motor operated as a torque motor under these conditions of operation will develop about 60% of its rated capacity; in other words, a ten horse power motor can be relied on to develop the equivalent of six horse power in torque in an installation of this kind. Hence for example in a very large unit a ten horse power auxiliary motor would replace a very much larger and bulkier counterweight, and at the same time the winch motor does not have to be as heavy, and its power requirements are lessened while its response is improved.

Figure 5:
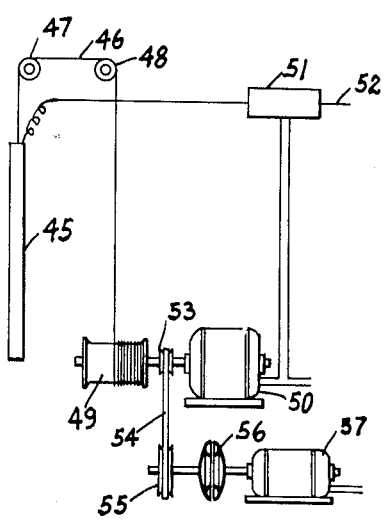
Fig. 5 is a schematic view showing the auxiliary motor coupled to the winch-driving motor through a fluid coupling or so-called fluid drive.

In the schematic arrangement shown in Fig. 5, the electrode 45 is again operated through a cable 46 passing over sheaves 47 and 48, and the cable is wound on a winch 49 driven by the winch motor 50 which is controlled by the sensing device 51 responsive to current flowing through electrode supply line 52. Here again the pulley 53 is placed on the drive between the motor and the winch, and is connected through a belt 54 to a pulley 55. The pulley 55 is connected through a fluid coupling 56 similar to the familiar fluid drive used in automobiles to a constantly energized motor 57. The motor 57 through the fluid coupling exerts a continuous force on the winch 49 in opposition to the weight of the electrode 45, but here again the force is insufficient of itself to turn the winch. However, by reason of the biasing force exerted through the motor 57 and the fluid drive, the weight of the electrode assembly is in part offset or counteracted, and the motor 50 will drive the winch in either direction as in Fig. 4 with the attendant advantages. By using a fluid coupling it may be possible to simplify the type of motor used at 57, or to better employ its operating characteristics. The slippage between the auxiliary motor and winch in such an arrangement takes place in the fluid drive rather than in the magnetic fluid as in the torque motor. In both Figs. 4 and 5 the biasing motor is actuated and controlled independently of the winch driving motor and is continuously energized during normal operation of the furnace.

Figure 6:
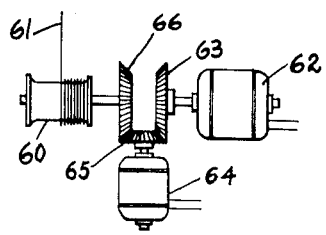
Fig. 6 is a similar schematic view showing the auxiliary motor operatively connected to the winch-driving motor through a gear.

As illustrative of another embodiment of my invention, Fig. 6 shows the electrode operating winch 60 operating the cable 61 similar to the cable described in the preceding embodiments, and 62 designates the winch driving motor 63 which drives a gear, and the winch 60 is provided with a gear 66. The auxiliary or biasing motor is designated 64 and operates as a torque motor. It drives a pinion 65 that is engaged between the gears 63 and 66. In this case the motor 64 exerts its effort continuously between the gears 63 and 66, and by the torque thus exerted it opposes the weight of the electrode, at least in part, but it does not produce sufficient power to drive the winch. However, when the winch driving motor 62 is operated in one direction or the other, as called for by the sensing device which may be similar to that previously described, but which is not shown in Fig. 6, the two motors function exactly as where they are connected through belts as in Fig. 4.

It will of course be apparent that in Figs. 5 and 6 the auxiliary motors 57 and 64 need not be electric motors, but can be any prime mover capable of generating the required torque.

Figure 7:
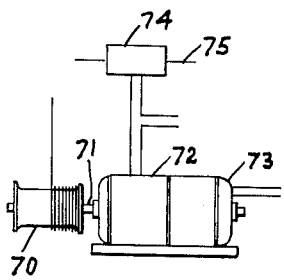
Fig. 7 is a schematic view indicating the two motors being built into a single frame.

As will hereinafter more fully appear, it is desirable that the torque motor or biasing motor, whatever its characteristics, be operatively interposed or connected between the winch operating motor and the winch where standard motors are used. This is in order to avoid overstressing the shaft of a standard motor where it is used to drive the winch. Otherwise the auxiliary motor might be coupled directly to the same shaft as the winch driving motor. It would of course be possible to use a heavier shaft, but this would require a special rebuilding of the motor, and if the motor is specially built, both the torque motor and the winch driving motor may be incorporated in the same frame and operate directly on the same shaft. This is diagrammatically illustrated in Fig. 7 where the winch is designated 70, and it is driven through a motor shaft 71 from a dual motor having one portion 72 constituting the winch operating motor, and having a section 73 constituting a torque motor, both the motors 72 and 73 operating directly on the shaft 71. The motor 73 is separately and continuously energized during operation of the electrode, whereas the motor 72 is operated through the sensing device 74 from the line 75 leading to the electrode.

With this explanation of my invention in a simplified manner, certain presently preferred forms of the equipment may now be described in detail.

Figure 8:
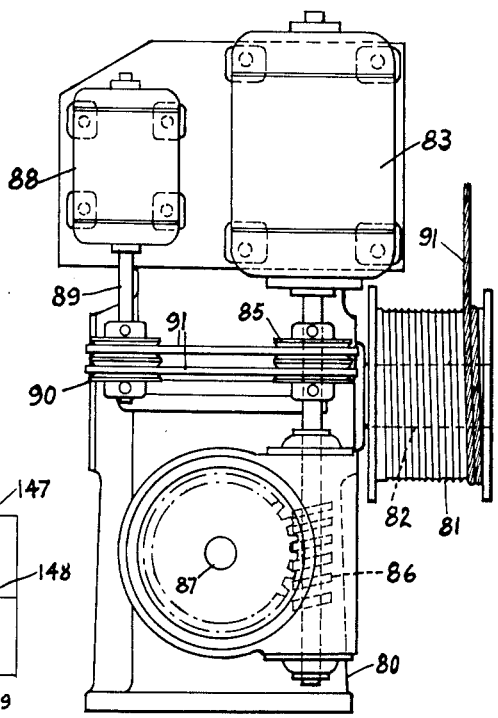
Fig. 8 is a side elevation of the complete electrode operating mechanism using a torque motor in addition to the winch-driving motor, showing an organization in which both motors are in a vertical position so as to conserve space and adapt them for use on a platform constituting an extended part of the furnace roof.

Referring now to Fig. 8, this figure shows a single unit for operating one of the electrodes. There is a base 80 which is designed to be set on the platform that projects to one side of the roof of the furnace. This base houses a speed reducing gear of conventional construction, which drives a winch drum 81 on a shaft 82 projecting from one side of the housing 80. The housing also serves to support the winch driving motor 83, the axis of which is vertical, and the shaft of which extends down into the housing 80. The shaft 84 of the motor carries a pulley 85 and the part that projects down into the housing is provided with a worm gear shown in dotted lines and indicated as 86. This worm gear meshes with a worm wheel inside the housing on a shaft 87, the particular details of the housing and gearing forming no part of the present invention, but it should be noted that the worm gear constitutes a non-reversible mechanism which prevents the winch from rotating when the motor 83 is de-energized, and such a worm gear is desirable in all of the embodiments hereinbefore described.

Mounted alongside the motor 83, also with its axis vertical, is the auxiliary or counterbalancing motor 88 having a shaft 89 projecting downwardly therefrom. This shaft carries pulleys 90 which are connected by belts 91 to the pulleys 85 on the motor shaft.

This arrangement provides a compact unit for operating the electrode, the floor area of which is relatively small. The cable 91 wound on the drum 81 is for operating the electrode. Three of the units so designed can readily be placed on a shelf or ledge projecting from one side of the roof along with the masts and other accessories associated with the electrodes.

The particular design of this unit lends itself to use on electric furnaces because of the small floor space requirements, and permits all operating equipment to be located on the extension of the furnace roof.

Figure 9:
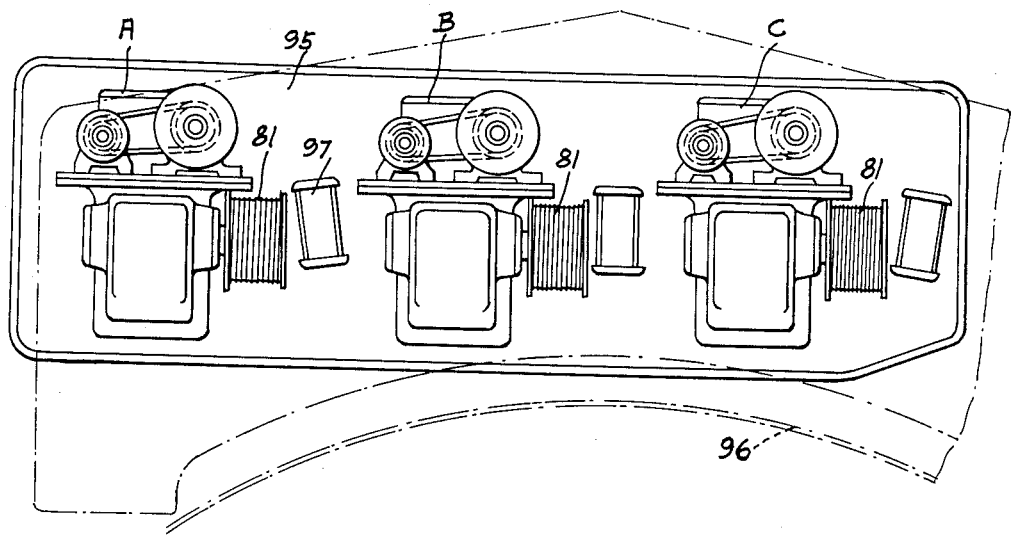
Fig. 9 is a schematic plan view showing the manner in which three units of the type disclosed in Fig. 8 are accommodated on the platform, the contour of the furnace itself being indicated in dotted lines.

In Fig. 9 I have shown more or less schematically in a plan view, how three of these units can be disposed on the shelf that projects laterally from the roof of the furnace. In this view, 95 designates a platform secured to the roof of the furnace and projecting laterally beyond the boundaries of the furnace, the boundaries of the furnace being indicated by the dotted line 96. Three of the motor winch units just described are shown side by side on this casting. These three units are all of the construction shown in Fig. 8 and are designated A, B and C respectively, while other parts of the unit are designated as indicated in Fig. 8. Alongside each unit is a structure 97 designed to receive the mast that supports the electrode-carrying arm and the sheaves in a manner well understood in the art and constituting no part of the present invention. With this arrangement the three motor-driven units for supplying the electrodes can be mounted at one side of the roof so as to move with the roof, eliminating the cumbersome tackle mechanisms heretofore necessary where counterweights have been used.

In Fig. 10 I have shown one typical circuit for the winch-driving motor, using as a motor control a General Electric "Amplidyne" system as previously referred to, but it will be understood that other standard equipment of this kind may be substituted, the particular control being only a matter of choice. The "Amplidyne" system embodies a motor generator unit of special construction. In the diagram shown in Fig. 10, 100 designates the electric furnace with a body of molten metal therein, and 101 is the electrode to be regulated, while 102 is a line which supplies current to the electrode. Fluctuations in current flowing through the line 102 are inductively impressed on a current transformer 103 which is in a closed circuit that includes a transformer primary 104. Current changes in the coil 103 are impressed through the transformer winding 104 to the secondary winding 105 of a transformer. The current from the transformer 105 is rectified by a rectifier 106 and the rectified current is supplied to field winding 107 of a motor generator unit in which 107 is the field for exciting the generator to provide a current flow in one direction, specifically a current flow for driving the electrode lifting or winch motor to raise the electrode. A shunt resistance 105a controls the strength of the field 107. At 104a is a short-circuiting switch which is open when the electrode is under automatic control, and closed when the electrode is being manually operated.

Connected directly with the electrode current supply line 102 through a manually-operable switch 108 is an adjustable resistor 109 that delivers current to one side of the rectifier 110, the other side of which is connected through wire 111 with the grounded side of the electric furnace 112. The output of the rectifier 110 is impressed on a field coil 113 for the motor generator equipment, the coil 113 being the field coil for the generator which is energized to drive the winch motor to lower the electrode. The armature of the generator is designated 114, and the generator is driven from an alternating current motor 115 which is indicated as being a three-phase alternating current motor. The generator has a differential field 114a. It also has a field coil 116 which is selectively connected through a reversing switch 117 with a source of D.-C. current supplied through the wires 118 and 119. The reversing switch 117 may be opened entirely to completely disconnect the field coil 116 from the D.-C. source, or it may be connected to the D.-C. line in such manner as to reverse the direction of current flow through the field 116 to reverse the direct current output from the generator. The current from the generator is supplied to the winch driving motor designated 120 having a field 121 connected to D.-C. supply lines 118 and 119, and which drives the winch 120a to raise or lower the electrode, depending on whether the field 107 or 113 is energized, or depending on the direction of flow of current through the field coil 116 when the latter is energized under manual control.

The torque motor is designated generally as 122, and is driven through a differentially-compensated D.-C. generator 123, the motor 122 having a field 122a connected through a variable resistor 124 with the D.-C. current source 118—119. The reference numeral 125 designates the belt which couples the torque motor 122 with the winch operating motor 120. The differentially-compounded D.-C. generator is driven from an alternating current motor 126. It has a field 127 which may be energized from the D.-C. current source 118—119 through a variable resistor or rheostat 128, which rheostat is also movable to an off position as is the variable resistor 124. The differential field for the generator is designated 129, and there is a switch 130 for the differential winding, and there is also a switch 131 between the generator 123 and the motor 122.

Referring further to Fig. 10, the operation may be easily understood. When the electrode is on automatic regulation, the switch 104a is open and switch 108 is closed and the reversing switch 117 is set to an off position so that the field coil 116 is not energized. The armature of the generator is continuously driven by the motor 115, and the winch driving motor 120 will be driven in one direction or the other, depending on the relative field strength of the fields 107 and 113. This is the conventional "Amplidyne" circuit, and to remove the system from automatic control to manual control, so as to more rapidly raise or lower the electrode, the switch 104a is closed and switch 108 is opened and the manual switch 117 is shifted to excite the generator 114 in a direction to turn the motor driving winch 120 in the desired direction. When the motor 120 is on automatic control, the motor 122 is controlled by the differentially-compounded D.-C. generator 123, the switch 131 then being closed and the switch 130 being open, so that the generator energizes the motor continuously in a direction such as to create a torque tending to turn the winch 120a through the belt 125 in a direction to lift the electrode. When the motor 120 is placed under manual control, the switch and resistor 124 are moved to the proper position to supply current to the field coil 122a and accelerate the speed of the motor 122 and increase its torque so as to enable the motor 122 in conjunction with the motor 120 to very effectively increase the speed at which the electrode is lifted when the furnace is to be taken out of operation. Assuming that the motor 122 is a ten horse power motor, it may under these circumstances develop the full ten horse power rating, and thereby very substantially increase the rate at which the winch is driven to elevate the electrode. This is of importance since the normal speed of movement is about four feet per minute, and the required movement may be several times this distance. When the electrode is to be lowered, the switch and resistor 124 can be opened to de-energize the field coil 122a, and the switch 131 may be opened between the generator 123 and the motor 122 so that the motor 122 is completely de-energized, and offers no resistance to the rapid lowering of the electrode under the manual operation of the motor 120.

The foregoing is merely typical of one circuit which may be employed in connection with the counterbalancing motor with the specific form of control. In Fig. 11 I have shown a diagram in which the torque motor is a wound rotor induction motor operated from a three-phase alternating current. In this diagram, 135 designates a wound rotor induction motor driving a pulley 136 that operates the belt 137, this belt corresponding to the belt 125 of Fig. 10, or the belt 42 of Fig. 4. The motor is connected with a three-phase A.-C. supply through the wires 138, 139, 140. Control of this motor is provided through three variable resistors 141, 142 and 143 with switches 144, 145 and 146 respectively, the resistors also being mutually interconnected through switches 147, 148 and 149. When the switches 147, 148 and 149, and the switches 144, 145 and 146 are closed, the motor 135 is driven to raise the electrode, the motor 135 then acting in its maximum capacity to aid the electrode lifting motor which is then in manual control, in accordance with the diagram shown in Fig. 10. If the switches 147, 148 and 149 are opened, the motor 135 will not operate, and therefore the winch-operating mechanism can work to lower the electrode at maximum speed and without bucking the motor 135. With the switches 147, 148, 149 closed, and the switches 144, 145 and 146 open, but with the resistors at the proper setting, the motor then functions as a counterbalancing motor in the automatic control system, creating a torque as previously explained.

It will be apparent to those skilled in the art, and particularly those cognizant with motor controls, that the disclosures herein specifically described are typical, and that a wide range of selection is possible in the type of motor and type of motor control which may be employed to accomplish the purposes of my invention, and that different motors and motor circuits may be selected according to the type of response that is desired under certain specific conditions, and depending upon what commercial source of motor is selected to perform the operation. In all of the various modifications of my invention herein specifically described, a winch driving motor operates to raise and lower the electrode, while an auxiliary prime mover exerts a biasing force which is continuously energized during all automatic operation of the winch motor and exerts a counterbalancing force on the electrode. The biasing force used in my invention is one which operates continuously when the winch driving motor is under automatic control, and is continuously effective to effect a substantially constant counterbalancing effort on the electrode. Electric motors, because of their relatively high efficiency and compact construction, lend themselves especially well to my purposes and consitute electromagnetic means for asserting a counterbalancing influence on the electrode which, while extremely effective, are also quite compact.

While I have shown and described certain specific embodiments of my invention, it will be understood that this is by way of illustration, and that various changes and modifications may be made within the contemplation of my invention and under the scope of the appended claims.

I claim:

1. The method of regulating the electrode of an electric arc furnace wherein a reversible motor driving a winch is utilized to effect the movement of the electrode which comprises continuously energizing an auxiliary prime mover operatively connected with the winch to apply a counterbalancing force to the electrode sufficient only to substantially counteract the pull of gravity on the electrode while utilizing the reversible motor to raise and lower the electrode.

2. The combination with an electric furnace electrode, of a system for operating the same including a cable, winch and reversible driving motor for the winch, of an auxiliary motor operated separately from the winch driving motor and operatively connected into said system by a mechanical drive for exerting a biasing force substantially counterbalancing the effect of gravity on the electrode.

3. An electrode operating mechanism as defined in claim 2 wherein said auxiliary motor is a torque motor.

4. Apparatus for regulating an electric furnace electrode which is vertically movable, comprising a reversible motor, a winch driven by the motor and a cable connecting the winch and the electrode, means responsive to the current flow to the electrode for reversibly operating said motor, and a second motor energized and controlled separately from the first motor for exerting a biasing force on the winch and driving motor therefor in opposition to the effect of gravity on the electrode and whereby the winch driving motor must operate against the second motor in lowering the electrode and in conjunction with it in raising the electrode.

5. Apparatus for regulating an electric furnace electrode comprising a motor, a winch driven by the motor and a cable connecting the winch and the electrode, means responsive to the current flow to the electrode for reversibly operating said motor, an electromagnetic means continuously energized to exert a biasing force opposed to the effect of gravity on the electrode on the winch and driving motor therefor.

6. A mechanism for raising and lowering an electric furnace electrode comprising a winch, a flexible driving motor therefor, a reducing gear including a worm operatively interposed between the driving motor and the winch, means for operating the said motor reversibly according to the current flow to the electrode being regulated, and a continuously energized biasing motor developing less power than said first motor operatively connected with the said first motor and winch for opposing motion of the winch in one direction and assisting it in the other direction.

7. A mechanism for raising and lowering an electric furnace electrode as defined in claim 6 wherein said first motor is provided with manually operable switch means by which it can be operated independently of the current flow to the electrode being controlled, and a manual control for the second motor by means of which it may yield increased power to aid in raising the electrode when said first motor is manually controlled or may be completely de-energized when said first motor is being manually controlled to lower the electrode.

8. A mechanism for operating a vertically movable electric furnace electrode comprising a housing having a reducing gear therein and a winch at one side of the housing, a drive shaft entering the top of the housing, a reversible driving motor set vertically above the drive shaft and connected therewith for driving the winch and a second motor set vertically alongside the first and operatively coupled thereto, automatic means for reversibly operating the first motor, and separate means energizing the second motor to cause it to continuously exert a substantially constant biasing force approximately opposed to the pull of gravity on the electrode.

9. In an electric furnace electrode operating mechanism in which the electrode is moved vertically, a main reversible drive motor for raising and lowering the electrode, an automatic control for said main motor responsive to the current flowing to the electrode to operate said motor to raise or lower the electrode, and a differentially-compounded D.-C. generator and shunt motor unit operatively coupled to the first motor for applying a substantially constant uni-directional torque to the first motor in opposition to the pull of gravity on the electrode and only substantially counterbalancing such pull of gravity.

10. An electrode furnace electrode operating mechanism comprising a winch, a reversible driving motor for the winch, means responsive to the current flow to the electrode being operated for controlling the operation of said motor to effect a raising or lowering movement of the electrode, a biasing motor operatively coupled with said motor and winch, and means for energizing the second motor in a direction to create a constant counterbalancing force on the winch in opposition to the effect of gravity on the electrode whereby the first motor is rendered more responsive to small fluctuations of current flowing to the electrode.

11. An electric furnace electrode operating mechanism comprising a winch, a reversible driving motor for the winch, automatic control means responsive to the current flow into the electrode being operated for controlling the operation of said motor to effect a raising or lowering movement of the electrode, a biasing motor operatively coupled with said motor and winch, means for energizing a second motor in a direction to create a constant counterbalancing force on the winch whereby the first motor is rendered more responsive to small fluctuations of current flowing to the electrode, means for placing the first motor under manual operation and rendering said automatic control ineffective, and means for selectively de-energizing the biasing motor when the first motor is under manual operation.

References Cited in the file of this patent

UNITED STATES PATENTS

| | | |
|---|---|---|
| 2,183,473 | Burgett | Dec. 12, 1939 |
| 2,518,580 | Trofimov | Aug. 15, 1950 |